United States Patent [19]

Edler

[11] Patent Number: 4,537,565
[45] Date of Patent: Aug. 27, 1985

[54] ELECTROMAGNETICALLY OPERATED DIAPHRAGM PUMP

[75] Inventor: Friedrich Edler, Bammental, Fed. Rep. of Germany

[73] Assignee: Chemie und Filter GmbH Verfahrenstechnik KG, Heidelberg, Fed. Rep. of Germany

[21] Appl. No.: 463,407

[22] Filed: Feb. 3, 1983

[30] Foreign Application Priority Data

Feb. 10, 1982 [DE] Fed. Rep. of Germany ....... 3204534

[51] Int. Cl.$^3$ ...................... F04B 43/04; F04B 17/04; H02K 5/18
[52] U.S. Cl. .................................. 417/413; 417/417; 310/64; 310/65
[58] Field of Search ................... 417/413, 412, 44, 63, 417/417; 310/43, 64, 65; 92/144, 155; 361/399, 412

[56] References Cited

U.S. PATENT DOCUMENTS

| | | | |
|---|---|---|---|
| 1,356,131 | 10/1920 | Cunningham | 310/68 R X |
| 2,763,796 | 9/1956 | Happe | 310/53 |
| 2,777,963 | 1/1957 | Kuntz | 310/43 X |
| 3,143,677 | 8/1964 | Heiler | 310/43 X |
| 3,365,597 | 1/1968 | Hanyu | 310/43 X |
| 3,396,288 | 8/1968 | Patrignani | 310/43 |
| 3,413,925 | 12/1968 | Campolong | 310/65 X |
| 3,688,635 | 9/1972 | Fegen | 361/412 X |
| 3,751,188 | 8/1973 | Willinger et al. | 417/417 X |
| 3,809,935 | 5/1974 | Kristen et al. | 310/68 R |
| 4,097,894 | 6/1978 | Tanner et al. | 361/399 X |
| 4,272,225 | 6/1981 | Fujinaka et al. | 92/180 X |

FOREIGN PATENT DOCUMENTS

| | | | |
|---|---|---|---|
| 994846 | 8/1976 | Canada | 417/413 |
| 52-41911 | 3/1977 | Japan | 417/417 |

OTHER PUBLICATIONS

Liquid Metronics, Inc., Bulletin 1024.
ProMinent Electronic Dosierpumpe Brochure.

*Primary Examiner*—Carlton R. Croyle
*Assistant Examiner*—T. Olds
*Attorney, Agent, or Firm*—Peter K. Kontler

[57] ABSTRACT

The membrane of a diaphragm pump is deformable by the reciprocable armature of a cylindrical electromagnet which is installed in the interior of a plastic housing adjacent to a partition which separates the winding or windings of the electromagnet from the casing of the pump and which carries the casing as well as the electromagnet. That section of the housing which surrounds the electromagnet is a relatively thin cylinder having circumferentially extending heat-dissipating ribs and a cylindrical internal surface which defines with the cylindrical external surface of the electromagnet a gap of constant width. The area around the cylindrical section of the housing is unobstructed, and the housing further includes a larger section which is integral with the cylindrical section, which is rigid with a foot extending well below the electromagnet to enhance the stability of the machine, and which confines a control circuit for the electromagnet.

21 Claims, 2 Drawing Figures

ELECTROMAGNETICALLY OPERATED DIAPHRAGM PUMP

CROSS-REFERENCE TO RELATED CASES

Fluid flow machines which utilize electromagnetic operating means for diaphragm pumps are disclosed in the commonly owned copending patent application Ser. No. 459,790 filed Jan. 21, 1983 by Michael Wally for "Diaphragm pump for use in an explosive atmosphere," in the commonly owned copending patent application Ser. No. 459,785 filed Jan. 21, 1983 by Michael Wally for "Diaphragm pump", and in the commonly owned copending patent application Ser. No. 462,373 filed Jan. 31, 1983 by Friedrich Edler for "Fluid flow machine with an electromagnetically operated diaphragm pump".

BACKGROUND OF THE INVENTION

The present invention relates to fluid flow machines in general, and more particularly to improvements in fluid flow machines of the type wherein the moving part or parts of the pump receive motion from an electromagnet. Still more particularly, the invention relates to improvements in fluid flow machines wherein an electromagnet is installed in a housing consisting at least in part of a synthetic plastic material and wherein such housing further confines a control circuit for the electromagnet.

It is already known to install the electromagnet of a fluid flow machine adjacent to a partition or wall which forms part of the housing and carries the casing of the pump. The control circuit is normally installed in a housing section which is adjacent to the section accommodating the electromagnet. In a conventional fluid flow machine of the just outlined character, the various actuating or adjusting elements in the form of knobs, switches or the like are disposed at the outer side of a rectangular plate whose inner side carries the components of the control circuit. The plate constitutes a cover or wall which is insertable into a complementary opening provided in the respective end portion of the housing. The housing has a substantially rectangular outline and consists of a synthetic plastic material. The cross-sectional configuration of the entire housing is at least substantially constant. A second wall of the housing, which is disposed opposite the aforementioned cover, is detachable and has a cylindrical extension to form therewith a portion of casing or head of the pump. The electromagnet is secured to a plate-like rectangular support, and those portions of the support which extend beyond the electromagnet are secured to the second wall by screws or similar fasteners. The upper side and the underside of that portion of the housing which surrounds the electromagnet are provided with cooling ribs extending in the axial direction of the electromagnet. The housing is provided with a supporting leg which is spaced apart from and is disposed at a level below the lower set of cooling ribs. The foot comprises two sidewalls which are integral with the housing.

It is well known that an energized electromagnet develops lost heat. The temperature in the region surrounding the electromagnet can reach a value which is excessive for a plastic housing. In fact, the temperature which a plastic housing can stand is relatively low so that a fluid flow machine of the above outlined character can employ a synthetic plastic housing only when the heat losses are relatively low, either because the required output of the pump is low or because the dimensions of the electromagnet exceed the required dimensions. This is undesirable due to excessive space requirements of an overdimensioned electromagnet as well as due to much higher cost and higher energy requirements of such electromagnet. Therefore, conventional compact high-output fluid flow machines employ metallic housings which ensure more satisfactory dissipation of heat than a plastic housing and whose material can stand much higher temperatures than a synthetic plastic substance.

OBJECTS AND SUMMARY OF THE INVENTION

An object of the invention is to provide a novel and improved fluid flow machine which can utilize a plastic housing even though the electromagnet produces substantial amounts of heat and even though the electromagnet is not larger than is necessary in view of the required performance of the machine.

Another object of the invention is to provide a novel and improved housing for use in a fluid flow machine wherein the moving part or parts of the pump are driven by an electromagnet.

A further object of the invention is to provide novel and improved means for ensuring rapid and pronounced dissipation of heat from that portion of the plastic housing which confines the electromagnet.

An additional object of the invention is to provide a fluid flow machine wherein each and every part of the housing is used with a high degree of efficiency and economy as regards the space requirements of the machine.

A further object of the invention is to provide a fluid flow machine which can utilize a compact and lightweight plastic housing under circumstances which presently necessitate the use of a metallic housing.

Another object of the invention is to provide the fluid flow machine with novel and improved means for securing the separable components to the remaining component or components of the housing.

Another object of the invention is to provide a novel and improved method of dissipating heat from that portion of the plastic housing in a fluid flow machine which surrounds the electromagnet.

A further object of the invention is to provide a novel and improved method of securing the pump and the electromagnet to the synthetic plastic housing of the fluid flow machine.

The invention is embodied in a fluid flow machine which comprises a pump (preferably an axial piston pump and most preferably a diaphragm pump), an electromagnet which is adjacent to and serves to operate the pump (e.g., the armature of the electromagnet can directly or indirectly reciprocate a portion of the diaphragm in the casing of the pump) and has an at least substantially cylindrical external surface, and a housing which includes a partition between the pump and the electromagnet. The housing further includes a substantially cylindrical section which is adjacent to the partition, which spacedly surrounds at least a portion of the cylindrical external surface of the electromagnet, and which defines with such external surface a gap of substantially constant width. The outer surface of the cylindrical housing section is exposed to the surrounding atmosphere and the housing comprises an additional section which supports the cylindrical section. At least the cylindrical section of the housing consists of a synthetic plastic material. It is presently preferred to make the entire housing of an electrically insulating synthetic plastic material. The housing further includes a preferably detachable casing or body for the pump, and such casing is adjacent to (and is preferably carried by) the partition opposite the cylindrical section of the housing. The cross-sectional area of the interior of the additonal section can substantially exceed the cross-sectional area of the interior of the cylindrical section, and the machine preferably further comprises a control circuit for the electromagnet; such control circuit can be installed, at least in part, in the interior of the additional section. Still further, the housing preferably comprises a preferably hollow supporting leg which is rigid with the additional section and preferably includes an extension which is spaced apart from and is disposed at a level below the cylindrical section of the housing.

The cylindrical section of the housing is preferably provided with external heat dissipating ribs or analogous projections, and at least some of these projections preferably extend circumferentially of the cylindrical section. The upper part of the additional section is rigid (preferably integral) with the cylindrical section, and the lower part of the additional section is rigid (preferably integral) with the leg. The partition is preferably integral with the cylindrical section of the housing. An opening of the additional section affords access to the control circuit; such opening is preferably remote from the electromagnet and is normally closed and sealed by a cover or a similar wall which forms a detachable or movable part of the housing. The control circuit comprises a supporting panel which is preferably disposed in a substantially vertical plane in the interior of the additional housing section and preferably includes a lower portion extending into the interior of the hollow leg and being preferably located at the level of the aforementioned extension. The cover or wall of the housing is preferably provided with means for supporting the panel of the control circuit in the interior of the additional housing section; such supporting means can comprise at least partly resilient retaining protuberances provided at the inner side of the wall. The wall is preferably vertical or nearly vertical, and its inner side faces the supporting panel of the control circuit. The protuberances extend from the inner side of the wall and can include deformable portions which extend into complementary apertures of the panel.

The aforementioned supporting panel or a second panel of the control circuit can be installed in the hollow leg of the housing. Such second panel is preferably substantially horizontal and can include a portion which is disposed in the interior of the extension. The leg preferably comprises internal guide means for the second panel, and such guide means can comprise a plurality of elongated guide members which slidably support the second panel and portions of which are disposed in the interior of the extension. The guide members can be installed at a location which is closely adjacent to the preferably horizontal bottom wall of the leg.

The machine can further comprise electric terminals which extend through and into the interior of the housing to connect the control circuit with an external source of electrical energy. Such terminals can be sealingly embedded in the plastic material of the housing and the vertical control panel can be provided with so-called throughplating holes for elastically deformable portions of the terminals so that the terminals are electrically connected with one or more modules, conductors and/or other components of the control circuit.

The partition preferably includes an annular portion (e.g., a relatively short collar-like portion which is coaxial with the cylindrical section of the housing) whose axial length preferably considerably exceeds the thickness of the cylindrical section. The partition can have one or more tapped bores for threaded fasteners which secure the pump casing or body to the partition. Such tapped bores can be provided in one or more inserts which are accommodated in complementary recesses or sockets of the partition. In addition, the partition can be provided with one or more holes for threaded fasteners (e.g., in the form of bolts or screws) which secure the electromagnet to the partition.

The novel features which are considered as characteristic of the invention are set forth in particular in the appended claims. The improved fluid flow machine itself, however, both as to its construction and the mode of assembling the same, together with additional features and advantages thereof, will be best understood upon perusal of the following detailed description of certain presently preferred embodiments with reference to the accompanying drawing.

DESCRIPTION OF THE PREFERRED EMBODIMENTS

Figure 1:
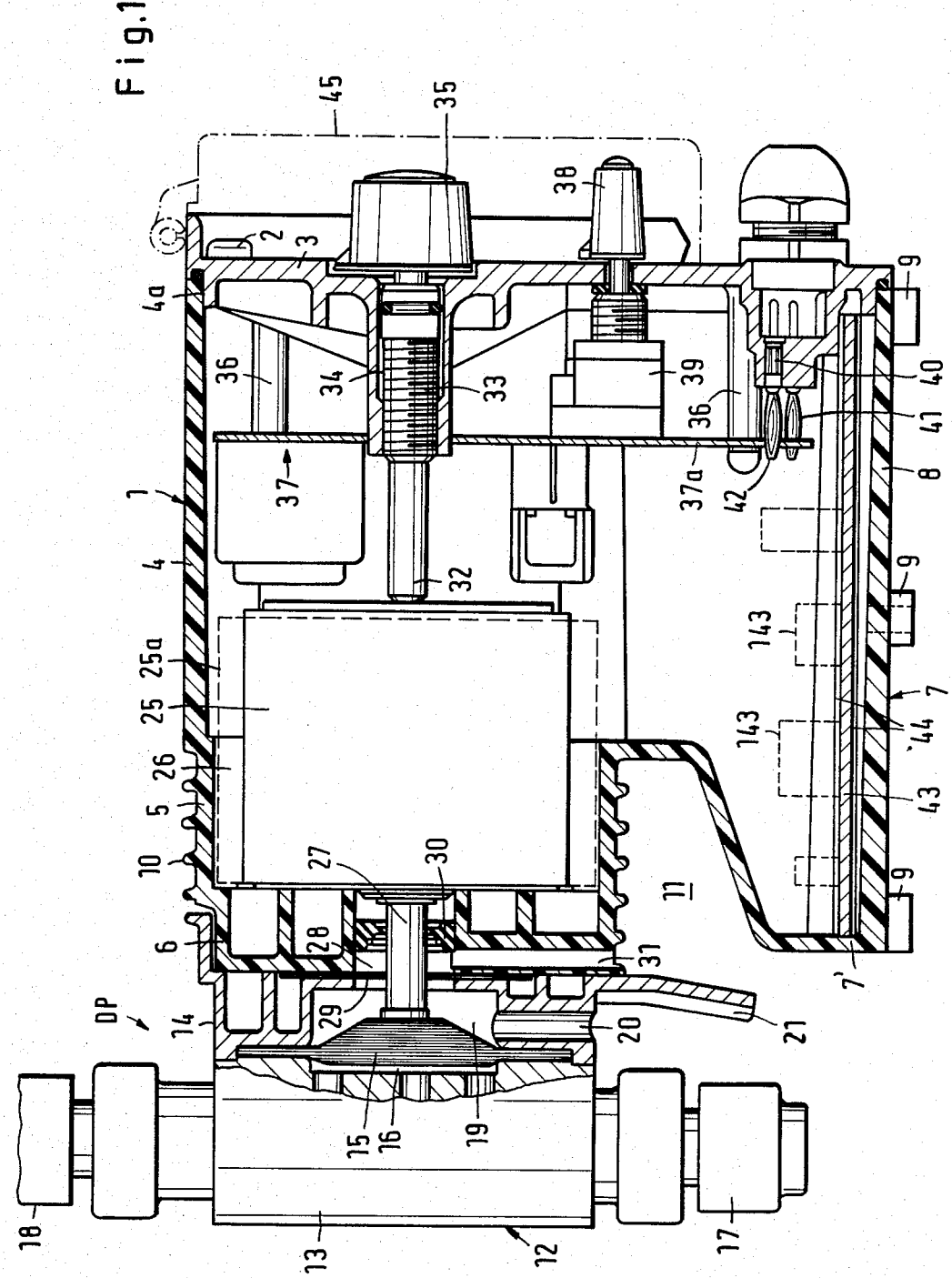
FIG. 1 is a somewhat schematic partly elevational but largely central longitudinal vertical sectional view of a fluid flow machine which includes a diaphragm pump and embodies one form of the present invention.

The fluid flow machine which is shown in FIG. 1 comprises an axial piston pump DP which is a diaphragm pump and whose casing or head 12 includes two sections 13 and 14 which can be fitted together in a manner as disclosed in the aforementioned copending patent applications of Wally so as to prevent the propagation of ignition from the interior of the casing or head 12 to the surrounding atmosphere. The casing 12 forms part of a composite housing 1 which consists of a synthetic plastic material and further includes a partition 6 which is fitted into the open right-hand end of the section 14, a cylindrical section 5 which is integral with the partition 6, an additional or main section 4 which is integral with the cylindrical section 5, and a hollow supporting leg 7 having an extension 7' and being integral with the lower part of the section 4. The latter has an opening 4a which is closed and sealed by a detachable or movable cover or wall 3 of the housing 1. The cover or wall 3 can be separably secured to the right-hand end portion of the main section 4 by a set of screws 2 or analogous fasteners. The cylindrical section 5 of the housing 1 is integral with the upper part of the main section 4 and is spaced apart from and disposed at a level above the extension 7' of the leg 7. The entire outer surface of the cylindrical section 5 is exposed to the surrounding atmosphere to allow for practically or completely unobstructed dissipation of heat. Such heat dissipating action of the cylindrical section 5 is enhanced by external cooling projections 10 in the form of ribs which may constitute discrete annuli or a continuous helix and extend in the circumferential direction of the section 5. The cross-sectional area of the interior of the additional housing section 4 greatly exceeds the cross-sectional area of the interior of the cylindrical section 5, and the latter spacedly surrounds an electromagnet 25 whose armature 27 (or a plunger which is reciprocable by the armature) serves to move back and forth a deformable membrane 15 of the diaphragm pump DP. The marginal portion of the membrane 15 is sealingly clamped between the sections 13 and 14 of the pump casing 12, and the section 13 defines with the membrane 15 a pumping chamber 16 which can receive a fluid (e.g., a sterilizing or an anticorrosion substance) by way of a suction pipe 17 and can discharge metered quantities of such fluid into a pressure pipe 18. Several presently preferred uses of the diaphragm pump DP are disclosed in the aforementioned commonly owned copending application of Edler, and the construction and manner of mounting various valves in the pipes 17 and 18 are disclosed in the aforementioned commonly owned copending applications of Wally.

The substantially horizontal bottom plate or wall 8 of the leg 7 and its extension 7' has floorcontacting pads or legs 9 and extends well below the cylindrical section 5 and can even extend below the partition 6 of the housing 1 to thus enhance the stability of the fluid flow machine. The bottom wall 8 extends all the way to the lowermost portion of the cover or wall 3. The reference character 11 denotes the space between the extension 7' and the cylindrical portion 5; this space contributes to highly satisfactory dissipation of heat by the ribs 10 along the entire outer surface of the cylindrical portion 5. The space 11 is preferably open in a direction toward the observer of FIG. 1 as well as in the opposite direction.

The section 14 of the pump casing 12 and the right-hand side of the membrane 15 define a second chamber 19 which is normally sealed from the pumping chamber 16 and can discharge leak fluid (if any) into a suitable collecting receptacle (not shown) disposed below an outlet 20 which is machined into or otherwise formed in the section 14 of the casing 12 at a level below the reciprocable member 27. If the membrane 15 is destroyed or loosened, either entirely or in part, fluid flows from the pumping chamber 16 into the second chamber 19 to be evacuated from the casing 12 via outlet 20. A downwardly extending shroud or shield 21 is disposed at the underside of the section 14 between the outlet 20 and the extension 7' of the leg 7. If the fluid issuing from the chamber 19 via outlet 20 is flammable, the likelihood of combustion and/or explosion is reduced because the shroud 21 keeps such fluid away from the ribs 10 at the outer surface of the cylindrical housing portion 5.

Figure 2:
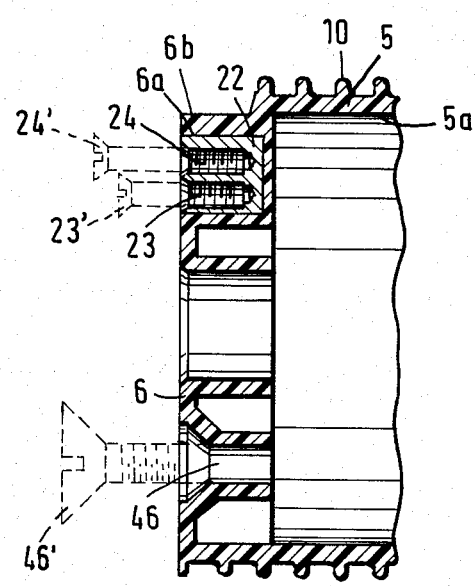
FIG. 2 is an axial sectional view of the partition of the housing which forms part of the improved fluid flow machine, the section being taken in a plane other than that of FIG. 1.

The left-hand side of the partition 6 is formed with several preferably equidistant sockets 6a (one shown in FIG. 2) each of which receives an insert or plug 22 having one or more tapped bores (FIG. 2 shows two tapped bores 23 and 24) for the threaded shanks of fasteners (such as screws 23' or 24' shown schematically in FIG. 2) which serve to detachably secure the section 14 of the pump casing 12 to the partition 6. For example, the partition 6 can be formed with four equidistant sockets 6a for discrete inserts 22. The provision of several tapped bores in the inserts 22 renders it possible to replace the illustrated casing 12 with a larger or smaller casing. The threaded shanks of fasteners for the section 14 of a larger casing will be received in the bores 24 which are more distant from the axis of the partition 6 than the bores 23; the latter bores can receive the threaded shanks of fasteners for a smaller-diameter pump casing. Each insert 22 can be formed with a single tapped bore or with more than two tapped bores, and the distribution of tapped bores is such that their axes form one or more circles whose centers are located on the axis of the partition 6. The latter comprises a cylindrical portion or sleeve 6b which is integral with the cylindrical section 5 and whose axial length preferably exceeds the thickness of the section 5; for example, the axial length of the sleevelike portion 6b of the partition 6 can be several times the thickness of the section 5.

The preferably cylindrical internal surface 5a of the section 5 spacedly surrounds the preferably cylindrical external surface of the electromagnet 25. This electromagnet is detachably secured to the partition 6 by one or more screws, bolts or analogous fasteners 46' (one indicated in FIG. 2 by broken lines) which extend through axially parallel holes 46 (one shown in FIG. 2) of the partition 6. FIG. 1 shows that the cylindrical portion 5 surrounds a substantial part (e.g., approximately one-half) of the cylindrical external casing surface of the electromagnet 25, as considered in the axial direction of the electromagnet. The annular gap 26 between the internal surface 5a of the section 5 and the external surface of the electromagnet 25 is of constant width.

The reciprocable member 27 (which may constitute the armature of the electromagnet 25 or a plunger which is reciprocable by the armature in combination with a spring, not shown but disclosed in one of the aforementioned patent applications of Wally) extends through a central aperture 28 of the partition 6 and is connected with the central portion of the deformable membrane 15. A second membrane 29 is clamped between the section 14 of the casing 12 and the partition 6 to seal the right-hand end of the chamber 19. A further seal 30 is provided in the aperture 28 and surrounds the reciprocable member 27. The latter can be sealingly secured to or merely extends without clearance through the central portion of the sealing membrane 29. A further outlet 31 is provided in the partition 6 between the membrane 29 and seal 30 to prevent the penetration of fluid from the chamber 19 into the interior of the cylindrical housing section 5. Thus, the improved machine is provided with several safety features which prevent penetration of a flammable fluid from the pumping chamber 16 into the interior of the housing section 5 in the event of damage to or destruction of the membrane 15 and/or 29.

The broken line 25a denotes in FIG. 1 the outline of a larger-diameter electromagnet which can be installed in the section 5 in lieu of the electromagnet 25. The energy requirements of the larger electromagnet 25a can greatly exceed those of the electromagnet 25; however, the provision of the gap 26 (whose width is evidently reduced in the electromagnet 25 is replaced with the electromagnet 25a) in combination with the relatively thin-walled section 5 and the external heat-dissipating projections 10 of the section 5 invariably ensures adequate cooling of the section 5 and electromagnet 25a. In fact, removal of heat is even enhanced if the width of the preferably uniform annular gap 26 is reduced.

The stroke of the armature of the electromagnet 25 or 25a can be selected by an adjustable stop 32 whose axial position can be changed by a rotary knob 35 accessible at the outer side of the cover or wall 3. The stop 32 has an externally threaded portion 33 meshing with an internally threaded protuberance 34 at the inner side of the wall 3. The knob 35 can be coupled with the externally threaded portion 33 in such a way that it can rotate and thereby move the stop 32 axially while its own axial position remains unchanged.

The inner side of the wall 3 is provided with additional protuberances 36 which are preferably integral with the wall 3 and whose left-hand end portions (as viewed in FIG. 1) serve as preferably resilient supports for a vertical supporting plate or panel 37 which carries various modules, conductors and other parts of a control circuit for the electromagnet 25 or 25a It is also possible to provide the panel 37 with openings which are smaller than the tips of the protuberances 36 and are surrounded by elastically deformable material to allow for proper retention of the panel 37 on the protuberances 36. One component of the control circuit on the panel 37 comprises a potentiometer 39 which is adjustable by a rotary knob 38; the latter is accessible at the outer side of the wall 3. The purpose of the potentiometer 39 is to select the frequency of energization of the electromagnet 25 or 25a and hence the frequency at which the pump DP delivers metered quantities of a fluid from the chamber 16 into the pipe 18.

The lower portion 37a of the panel 37 extends downwardly into the interior of the leg 7 to the level of the extension 7'. Such lower portion 37a is formed with holes or bores 42 for the innermost portions 41 of electric terminals 40 which are sealingly received in the lower portion of the wall 3 and are connected or connectable to a suitable energy source, not shown. The portions 41 of the terminals 40 are resiliently compressible so that they snugly engage the material of the panel portion 37a around the holes 42 and thereby ensure adequate electrical connection between the energy source and various components of the control circuit on the panel 37. The holes 42 are throughplated to enhance the electrical connection between the selected components of the circuit and the main portions of the terminals 40.

The illustrated control circuit includes additional components 143 which are mounted on a substantially horizontal second supporting panel 43. The latter is installed in the interior of the hollow leg 7 and its left-hand portion extends into the extension 7'. The components 143 on the second supporting panel 43 are indicated by broken lines. The panel 43 is slidable between two horizontal guide members 44 which are integral with or are removably installed in the leg 7 at a level close to the bottom wall 8. The arrangement is preferably such that the panel 43 can be extracted from its guide members 44 in a direction to the right, as viewed in FIG. 1, upon detachment of the wall 3.

If desired, the housing 1 of the improved fluid flow machine can be provided with an outer cover or lid 45 (indicated in FIG. 1 by phantom lines) which is pivotally secured to the section 4 or to the wall 3 and normally overlies and seals the knobs 35, 38 and/or other parts at the outer side of the wall 3.

The housing 1 can be made of a wide variety of synthetic plastic materials. It is presently preferred to make the housing 1 of polyphenolene oxide or a material exhibiting similar characteristics, especially as concerns its strength and its chemical stability.

The width of the gap 26 between the cylindrical section 5 and the electromagnet 25 or 25a is preferably small. The presently preferred width of the gap 26 is less than 6 millimeters.

An important advantage of the improved fluid flow machine is that it can employ a synthetic plastic housing even though the electromagnet 25 or 25a generates substantial quantities of lost heat. This is due to the fact that the housing section 5 is designed to ensure pronounced and predictable dissipation of heat from the region surrounding at least the major part of the cylindrical external surface of the electromagnet. The uniformity of heat transfer from the electromagnet 25 or 25a to the cylindrical section 5 is attributable to the constant width of the gap 26 all the way around the cylindrical external surface of the electromagnet. The uniformity of heat transfer from the gap 26 into the surrounding atmosphere is due to cylindrical shape of the section 5 and to the fact that the section 5 extends around the entire electromagnet. The transfer of heat from the section 5 to the surrounding atmosphere is also uniform and predictable, partly due to the provision of space 11, partly due to the cylindrical shape of the section 5, and partly due to the provision of preferably circumferentially extending ribs 10 at the exterior of the section 5. As mentioned above, the entire exterior of the section 5 is unobstructed to allow for free circulation of air and for removal of heat from the region of the ribs 10.

In presently known fluid flow machines which employ electromagnets as a means for operating the pump, the width of the space around the electromagnet is not uniform so that regions of more satisfactory heat dissipation alternate with regions where the heat dissipation is much lower or even highly unsatisfactory. Furthermore, the thickness of the housing part in the region of the electromagnet in a conventional machine is not uniform so that such housing part offers to the transfer of heat a resistance which varies from very low to extremely high, i.e., certain portions of the housing are overheated to an extent which renders it impossible to make such housing portions of a synthetic plastic material. In a presently preferred embodiment of the machine of the present invention, the thickness of the section 5 barely suffices to ensure the required stability i.e., the section 5 is relatively thin to ensure that the plastic material, whose heat-conductivity is rather low, can dissipate all of the heat which is generated by the electromagnet 25 or 25a. As mentioned above, the entire exterior of the section 5 is fully exposed to the surrounding atmosphere to avoid uneven transfer of heat from the section 5. The ribs 10 not only promote the dissipation of heat from the section 5 into the surrounding atmosphere but also reinforce this section so that the wall thickness of the housing 1 around the electromagnet 25 or 25a can be reduced still further. It has been found that circumferentially extending ribs 10 offer a minimal resistance to thermally induced upward flow of air so that such ribs further promote the circulation and continuous exchange of air around the section 5.

The provision of a hollow leg 7, whose extension 7' is located below the cylindrical section 5 and which can even extend below the partition 6 and casing 12, contributes to stability of the housing 1 on the floor and provides additional room for component parts of the control circuit. The center of gravity of the fluid flow machine is determined primarily by the location of the electromagnet 25 or 25a so that the provision of the leg 7 with an extension 7' extending below and even beyond the electromagnet (i.e., toward the pump) evidently contributes to higher stability of the machine. The feature that the extension 7' is not made integral with the section 5 contributes to more satisfactory dissipation of heat because the space 11 remains open at both ends and allows for unobstructed circulation of air around the lower portions of the ribs 10.

The feature that the section 5 is connected to the upper part and the leg 7 is connected to the lower part of the section 4 contributes to compactness of the machine without interfering with free circulation of air around the. entire section 5 and without affecting the stability of the machine on the floor or wherever the machine is installed. The manufacturing cost is reduced due to the fact that the sections 4, 5, the leg 7 and the partition 6 of the housing 1 can constitute a one-piece body.

The utilization of a panel (37) which is substantially vertical and extends all the way into the interior of the hollow leg 7 enables this panel to support all components of the control circuit or at least a substantial number of such components. The capacity of the panel 37 to carry the components of the control circuit is surprising in view of the compact design of the housing 1. The provision of protuberances 36 at the inner side of the cover 3 contributes to simplicity of mounting the panel 37 in the interior of the section 4. Furthermore, the provision of simple snap-on connections between the panel 37 and the protuberances 36 contributes to simplicity of detachment of the panel 37 from or reattachment of this panel to the cover 3. The protuberances 36 can constitute integral parts of the cover 3. This reduces the manufacturing cost since the provision of protuberances on a plastic cover presents no problems and can be carried out by resorting to any one of a variety of known manufacturing techniques.

The provision of the second panel 43 in the interior of the leg 7 is desirable and/or necessary if the control circuit for the electromagnet 25 or 25a is rather complex, i.e., if such circuit comprises a large number of components all of which cannot be installed in or on a single panel. Alternatively, the second panel 43 will be provided if the manufacturer wishes to further reduce the dimensions of the housing, particularly to reduce the overall height of the section 4 which might necessitate a reduction of the size of the vertical panel 37. In other words, the improved fluid flow machine can employ two relatively small panels or a large panel in the leg 7 and a smaller panel in the section 4, depending on the desired configuration and overall dimensions of the housing.

By selecting (at least for the cover 3) a synthetic plastic material which is an electrical insulator, it is possible to embed the terminals 40 directly in the material of the cover. This can be carried out by inserting the terminals into the mold of an injection molding or extruding machine, by resort to ultrasonic or analogous bonding techniques, by using terminals which are a press fit in the complementary holes or bores of the cover, or in any other suitable way. A technique which ensures immediate embedding of portions of the terminals 40 in the material of the cover 3 is preferred at this time because it reduces the cost and/or the need for sealing around the terminal portions which extend through the member 3. The utilization of elastic terminal portions 41 which must be deformed in order to enter the respective holes 42 is desirable and advantageous because it ensures the establishment of reliable electrical connections with the components of the control circuit, especially since the holes 42 are preferably throughplated, i.e., they are surrounded by electrically conductive material. The arrangement is preferably such that the electrical connections between the terminals 40 and the components of the control circuit on the panel 37 are established in automatic response to attachment of this panel to the protuberances 36 of the cover 3.

The placing of inserts 22 into the sockets 6a of the partition 6 does not interfere with adequate removal of heat from the electromagnet 25 or 25a. The major part of heat is removed in the radial direction of the electromagnet so that the removal of heat in the axial direction of the electromagnet (via partition 6) need not be very pronounced. In other words, the thickness of the partition 6 can be sufficiently pronounced to warrant the utilization of this part of the housing 1 as a means for supporting the casing 12 and the electromagnet (note the fasteners 23' or 24' and 46').

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A fluid flow machine, comprising an axial piston pump, particularly a diaphragm pump; an electromagnet adjacent to and arranged to operate said pump and to thereby generate heat, said electromagnet having an at least substantially cylindrical external casing surface; and a housing including a partition disposed between said pump and said electromagnet, a substantially cylindrical section adjacent to said partition, spacedly surrounding at least a portion of said external casing surface and defining therewith a gap of substantially constant width for transfer of heat from said cylindrical external casing surface to said cylindrical section, said cylindrical section having an outer surface which is exposed to the surrounding atmosphere and external heat dissipating projections at least some of which extend circumferentially of said cylindrical section, said housing further including an additional section integral with and supporting said cylindrical section and the cross-sectional area of the interior of said additional section exceeding the cross-sectional area of the interior of said cylindrical section, said additional section extending downwardly beyond said cylindrical section and said housing also including a supporting leg rigid with said additional section and having an extension extending toward said pump and spaced apart from and disposed at a level below said cylindrical section, said cylindrical section, said additional section and said leg of said housing consisting of a synthetic plastic material.

2. The machine of claim 1, wherein said housing further includes a casing for said pump, said casing being adjacent to said partition opposite said cylindrical section.

3. The machine of claim 1, further comprising a control circuit for said electromagnet, at least a portion of said circuit being installed in said additional section.

4. The machine of claim 1, wherein said partition is integral with said cylindrical section.

5. The machine of claim 1, wherein said additional section has an opening and said housing further includes a wall closing said opening.

6. The machine of claim 1, wherein said leg is hollow and further comprising a control circuit for said electromagnet, said circuit including a supporting panel disposed in said additional section and having a portion extending into said leg.

7. The machine of claim 6, wherein said panel is disposed in a substantially vertical plane and said portion thereof is located at the level of said extension.

8. The machine of claim 6, wherein said panel is disposed in a substantially vertical plane and said additional section has an opening adjacent to said panel, said housing further comprising a wall closing said opening and said wall including means for supporting said panel.

9. The machine of claim 8, wherein said supporting means includes at least partly resilient retaining protuberances on said wall.

10. The machine of claim 8, wherein said wall is substantially parallel to and spaced apart from said panel, said panel being disposed between said wall and said electromagnet and said wall having an inner side facing said panel, said supporting means being provided at the inner side of said wall.

11. The machine of claim 1, wherein said leg is hollow and further comprising a control circuit for said electromagnet, said circuit including a panel installed in said leg.

12. The machine of claim 11, wherein said panel is substantially horizontal and includes a portion disposed in the interior of said extension.

13. The machine of claim 11, wherein said leg comprises internal guide means and said panel is slidably received in said guide means.

14. The machine of claim 13, wherein said leg has a substantially horizontal bottom wall and said guide means comprises a plurality of elongated guide members adjacent to said bottom wall and having portions disposed in the interior of said extension.

15. The machine of claim 1, wherein said plastic material is an electrically insulating synthetic plastic material and further comprising electric terminals extending through and into the interior of said housing.

16. The machine of claim 15, wherein said terminals are sealingly embedded in the plastic material of said housing.

17. The machine of claim 16, further comprising a control circuit for said electromagnet, said circuit including a substantially vertical panel disposed in said additional section and having throughplating holes for portions of said terminals.

18. The machine of claim 1, wherein said partition includes an annular portion having an axial length substantially exceeding the thickness of said cylindrical section.

19. The machine of claim 1, wherein said partition has tapped bores and said housing further comprises a casing for said pump, and further comprising threaded fastener means securing said casing to said partition and extending into said tapped bores.

20. The machine of claim 19, wherein said partition has at least one socket and an insert in said socket, said tapped bores being provided in said insert.

21. The machine of claim 1, wherein said partition has holes and further comprising fastener means securing said electromagnet to said partition and extending into said holes.

* * * * *